(12) United States Patent
Boudreau et al.

(10) Patent No.: US 8,494,533 B2
(45) Date of Patent: Jul. 23, 2013

(54) BEAMFORMING FOR CELL EDGE CAPACITY IMPROVEMENT IN A HETEROGENEOUS NETWORK

(75) Inventors: Gary David Boudreau, Kanata (CA); Konstantinos Dimou, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 125 days.

(21) Appl. No.: 13/192,638

(22) Filed: Jul. 28, 2011

(65) Prior Publication Data

US 2013/0029669 A1      Jan. 31, 2013

(51) Int. Cl.
*H04W 36/04*      (2009.01)

(52) U.S. Cl.
USPC ............................... 455/445; 455/517

(58) Field of Classification Search
USPC ............... 455/445, 456.1, 456.2, 517, 561, 455/562.1
See application file for complete search history.

(56) References Cited

U.S. PATENT DOCUMENTS

| | | |
|---|---|---|
| 2010/0020702 A1 | 1/2010 | Wong et al. |
| 2010/0323612 A1 | 12/2010 | Xu et al. |
| 2011/0007685 A1 | 1/2011 | Ma et al. |
| 2011/0081865 A1 | 4/2011 | Xiao et al. |
| 2012/0165034 A1 | 6/2012 | Boudreau et al. |
| 2012/0202548 A1* | 8/2012 | Lee et al. ...................... 455/513 |

FOREIGN PATENT DOCUMENTS

WO      2009137092 A1      11/2009

OTHER PUBLICATIONS

Landstrom, Sarah et al, "Heterogeneous networks-increasing cellular capacity",2011 ,p. 01-6.
Ericsson. "Downlink data performance with TDM-based interference coordination",R1-104065,2010,p. 01-06, Ericsson, Germnay.
Ericsson. "On data channel performance with cell range expansion and non-full buffer traffic",R1-105336,2010,p. 01-08, Ericsson, China.
Liang, Yifan et al, Evaluation of base stations in cellular networks: danser deployment versus coordination,2008, p. 4128-4132,ICC,Stanford,CA.

* cited by examiner

*Primary Examiner* — Sam Bhattacharya
(74) *Attorney, Agent, or Firm* — Roger Burleigh; Ericsson Inc.

(57) ABSTRACT

The present disclosure relates to providing a method of improving data rates in a heterogeneous network which is composed of macro cells and pico cells. User equipment is connected to the network via a macro base station serving a macro cell or a low power node serving a pico cell. A signal strength indicator is received from one or more UEs located in a macro cell and adjacent one or more pico cell. The location of a UE within a region of a macro cell or a pico cell is identified according to the signal strength indicator. Then, a weak coverage area of macro cell is identified according to the signal strength indicator and a beam forming antenna of a macro base station serving the macro cell where the UE is located, is directed to steer the antenna beam to an area of the cell requiring an improved signal strength indicator.

25 Claims, 6 Drawing Sheets

BEAMFORMING FOR CELL EDGE CAPACITY IMPROVEMENT IN A HETEROGENEOUS NETWORK

FIELD OF THE INVENTION

The present application relates generally to heterogeneous networks and, more specifically, to heterogeneous networks with beamforming techniques for improving network capacity.

BACKGROUND OF THE INVENTION

The constantly increasing demand for high data rates in cellular networks requires new approaches to meet this expectation. A challenging question for operators is how to evolve their existing cellular networks so as to meet the requirement for higher data rates. In this respect, a number of approaches are possible: i) increase the density of their existing macro base stations, ii) increase the cooperation between macro base stations, or iii) deploy smaller base stations in areas where high data rates are needed within a macro base stations grid. This last option is referred to in the related literature as a "Heterogeneous Network", or "Heterogeneous Deployment" and the layer consisting of smaller base stations is termed a "micro", or "pico" layer.

Building a denser macro base station grid, while simultaneously enhancing the cooperation between macro base stations (hence either using options i) or ii) above) is definitely a solution that meets the requirement for higher data rates; however such an approach is not necessarily a cost-efficient option, due to the costs and delays associated with the installation of macro base stations especially in urban areas where these costs are significant.

In this landscape, the solution of deploying small base stations within the already existing macro layer grid is an appealing option, since these smaller base stations are anticipated to be more cost-efficient than macro base stations, and their deployment time will be shorter as well. However, such a dense deployment of macro base stations would lead to a significantly higher amount of signaling due to frequent handovers for users moving at high speeds.

In contrast, the macro layer grid of a heterogeneous network can serve users moving at high speed, as well as service wider areas where the demand for high data rates is less and the grid consisting of smaller base stations in the heterogeneous network can be employed to service areas having a higher density of users requiring high data rates, or hotspots as these areas are termed.

One of the main targets of low power nodes is to absorb as many users as possible from the macro layers. In theory, this helps to offload the macro layer and allow for higher data rates in both the macro and in the pico layer.

In this respect, several techniques have been discussed and proposed within 3GPP:
- extending the range of small cells by using cell specific cell selection offsets
- by increasing the transmission power of low power nodes; and
- by simultaneously setting appropriately the UL power control target PO for the users connected to low power nodes.

The problem with heterogeneous networks is that small base stations, even if they are easier to deploy and operate than macro base stations, still cannot be deployed everywhere since there are restrictions on where to place them. Furthermore, often the placement of small base stations or relay nodes, results in insufficient coverage for all of the users targeted to be served. Hence, even after the addition of small base stations around them, there still exists the possibility of users being in coverage holes of the macro layer, and as such they do not necessarily benefit from this addition of small base stations, relays, or low power nodes, in general. This can happen due to an obstacle, such as a wall, or similar barrier being between the low power node and the user in the macro layer coverage hole.

Moreover, a situation like the one described above might occur even in the case of significant obstacles between the low power nodes and certain users. Due to the much higher power transmitted by the macro base stations, low power nodes do not always succeed in absorbing many users. For example, there might be cases such as the macro layer not providing good coverage to a certain area, and thus users in this area could still connect to the macro base station rather than to the low power node nearby.

There are also other occasions where the addition of low power nodes does not yield the desired result. Consider the case where during certain time periods of either a day, or a week, there is a high concentration of users within a given geographical area. There could be a number of reasons that would cause an operator to not deploy a sufficient amount of macro base stations in such a coverage area. Reasons include the possibilities that base station sites are very costly to obtain in this area or the morphology of the area is such that it does not facilitate the provision of high data rates to users therein. Another reason might be that adding macro base stations is not profitable in this area, considering that this area might be underutilized for a significant percentage of the day, or during the week. The operator could then decide to deploy low power nodes within this area. Due to the difficulties in finding sites, or due to the cost analysis performed, it could be decided to deploy a limited amount of low power nodes in this area. Furthermore it may be decided to extend the range of the low power nodes in order to absorb as many users as possible in the area. By doing so, two primary effects will be observed in the downlink i) users connected to lower power nodes due to this range expansion could experience worse link conditions than on the link to the macro base station and ii) a higher number of users share the pool of resources within the small cell.

Cell selection is done typically on the basis of reference symbols received power (RSRP) in the downlink (DL) reference symbols. Typically, a handover (HO) from a serving cell to a neighbouring cell occurs when the RSRP from the neighbouring cell, $RSRP_{neighbor}$ is higher than the RSRP from the serving cell, $RSRP_{serving}$, serving plus an HO margin (used so as to avoid ping-pong HOs), plus a cell selection offset:

$$RSRP_{neighbor} \geq RSRP_{serving} + \text{HO margin} + \text{Offset}$$

When trying to expand the range of low power nodes (small cells), so as to facilitate HOs from the serving macro cells to neighbor pico cells, the value of the Offset above is set to negative values. This means that the UE is connected to a low power node (LPN), even if the RSRP from this LPN is lower than the RSRP from the macro cell. This has a consequence that the UE receives lower quality signal in the DL, than the UE would have received if the UE had remained at the macro cell coverage.

Note that in the uplink, users at the extended range of small cells experience a better link than the one experienced within the macro cell but effect ii) still applies in this direction as well. The combination of these two effects mentioned above possibly results in the average data rate per user in the downlink not being substantially higher than that of the macro cell or probably, the average data rate per user is not high relative to the desired level.

SUMMARY OF THE INVENTION

The present invention is directed to alleviating the problems of the prior art.

The present invention overcomes the problems of the prior art by providing a method of improving data rates in a heterogeneous network which is composed of macro cells and pico cells. User equipment is connected to the network via a macro base station serving a macro cell or a low power node serving a pico cell. A signal strength indicator is received from one or more UEs located in a macro cell and adjacent one or more pico cell. The location of a UE within a region of a macro cell or a pico cell is identified according to the signal strength indicator. A weak coverage area of a macro cell is then identified according to the signal strength indicator. A beam forming antenna of the macro base station serving the macro cell where the UE is located, is then directed to steer the antenna beam to an area of the cell requiring improved signal strength.

In accordance with a further embodiment of the invention, there is provided a base station for improving data rates in a heterogeneous network which is composed of macro cells and pico cells, and wherein user equipment connects to the network via said base station. The base station is comprised of an antenna and a transmitter coupled to the antenna. The base station has a receiver for receiving a signal strength indicator from one or more user equipment located in the heterogeneous network and a processor for identifying a weak coverage area for a user equipment located in the macro cell according to the signal strength indicator and for identifying the location of the user equipment within a region of the heterogeneous network when the signal strength indicator is below a certain level; and wherein the antenna is instructed to direct its beam towards the user equipment and an area of the cell requiring an improved signal strength.

Other aspects and features of the present invention will become apparent to those of ordinary skill in the art upon review of the following description of specific embodiments of the invention in conjunction with the accompanying figures.

DETAILED DESCRIPTION OF THE EMBODIMENTS

Figure 1A:
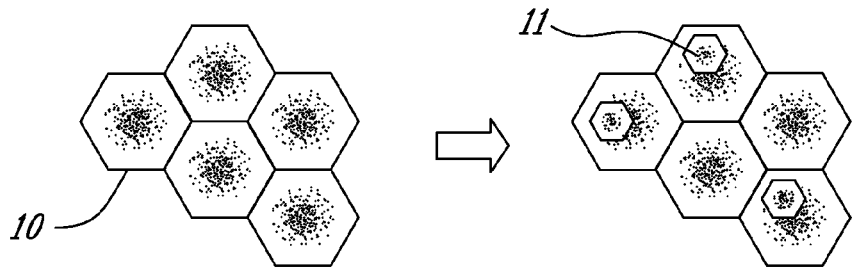
FIGS. 1a, 1b and 1c are schematic diagrams illustrating heterogeneous networks according to the prior art.

In order to lighten the following description, the following acronyms will be used:
BTS Base Transceiver Station
COMP Coordinated Multi-Point
FFR Fractional Frequency Reuse
HetNet Heterogeneous Network
LPN Low Power Node
MIMO Multiple Input, Multiple Output
OAM Operation and Maintenance
PRS Positioning Reference Signal
RSRP Reference Symbol Received Power In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As indicated above, the present invention addresses the issues brought out by the aforementioned prior art.

The concept of heterogeneous networks (HetNet) has emerged in the context of Long Term Evolution (LTE) and LTE-Advanced. A heterogeneous network is a radio access network that comprises layers of different-sized cells ranging from big (macrocells) to small (microcells, picocells and femtocells). In order to reach the full bandwidth capacity of either protocol, it is thought that operators will need to supplement their traditional large macrocells with many different-sized small cells.

The importance of the HetNet concept and the work that's going on in standards bodies, such as the Institute of Electrical and Electronics Engineers Inc. (IEEE) and 3rd Generation Partnership Project (3GPP), is that it will define how all those different-sized cells will work together, how hand-off among them will be achieved, and how interference among them will be minimized.

Typically a heterogeneous radio access network comprises plural macro and micro cells. Further, in some heterogeneous radio access networks the operation of the macro base stations for the macro cells and micro base stations for the micro cells may be coordinated, particularly in a Coordinated Multipoint (CoMP) system. In a CoMP architecture a collection of cells (e.g., the coordinated set of cells) may be connected to a central node that coordinates the transmission/reception of user signals to mitigate interference among the smaller sub-cells. CoMP architecture is understood with reference to, e.g., U.S. patent application Ser. No. 12/563,589, entitled "Inter-Cell Interference Mitigation", also published as United States Patent Publication US 2010/0261493, which is incorporated herein by reference in its entirety.

With reference to the present invention, it should be understood that in the illustrated embodiments, the macro cells and micro base stations and their respective locations within or near the macro cell are not limiting, since a macro cell could encompass one or more than the illustrated micro cells and such micro cells may be diversely and non-uniformly arranged from one macro cell to another, depending upon geographic utilization and traffic need and conditions.

As used herein, the terminology "micro base station" is to be understood as broadly encompassing any type of station which operates over a radio or air interface on both downlink (DL) and uplink (UL) and has extent of transmission that is lesser than (e.g., in geographic range or power) or subordinate to (e.g., delegated from/by) a macro base station. In corresponding fashion the terminology "micro cell" refers to any cellular territory or coverage area served by such broadly defined micro base station. Examples of types of cells and base stations encompassed by the terminology "micro cell" and "micro base station" also include pico cells and pico base stations, femto cells (which can exist in a femto cluster) and femto base stations, and relay base stations. Similarly, the term low power node (LPN) can be used to refer to small base stations, micro, or pico, or femto base stations. Small base stations mainly means base stations transmitting with lower power and with fewer processing/hardware capacities than the normal macro base stations.

It should be noted and it will be known to those knowledgeable in the art that users report their received signal strength on the reference symbols, i.e. Reference Symbol Received Power (RSRP) from the serving cell and from neighbor cells. Hence an UE located at the cell edges of a macro cell and in proximity to a LPN, reports to its serving macro base station RSRP received from the macro & from the neighbor LPN. From these measurements, the macro base station can deduce if there are users at the cell edges of the macro cell close to LPNs.

FIG. 1a illustrates the basic principle of heterogeneous deployment. The larger macro cells 10 are able to provide coverage to a larger service area but the addition of micro/pico cells 11 improve network capacity in certain regions of those macro cells. Resources between the macro and micro/pico cells can be semi-static, dynamic or shared across the macro-micro/pico layers. As indicated previously, one of the main targets of LPNs is to absorb as many users as possible from the macro layers. In an ideal scenario, this helps to offload the macro layer and allows for higher data rates in both the macro and in the pico layer.

Figure 1B:
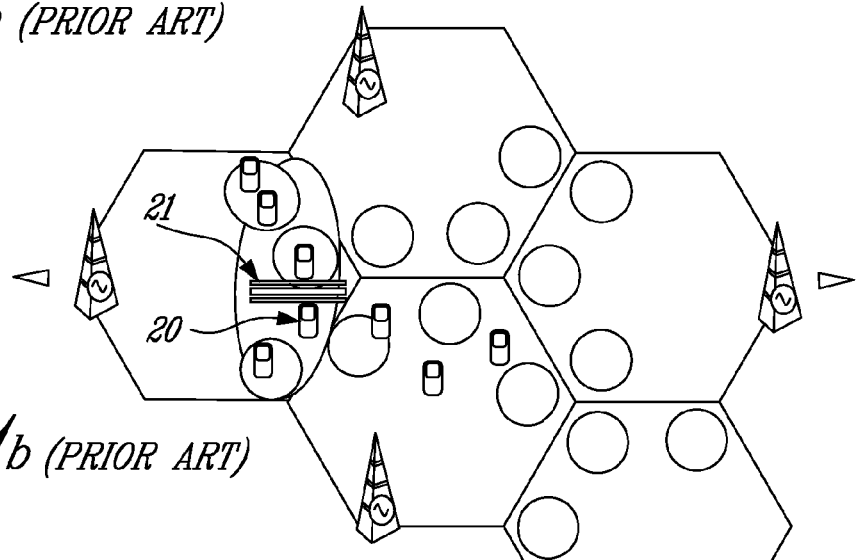

As illustrated in FIG. 1b, one problem with heterogeneous networks is that, even after the addition of LPNs, there still exists the possibility of users 20 being in coverage holes of the macro layer, and as such they do not necessarily benefit from this addition of small base stations, relays, or low power nodes, in general. This can happen due to an obstacle, such as a wall 21, or similar barrier between the low power node and the user in the macro layer coverage hole.

Figure 1C:
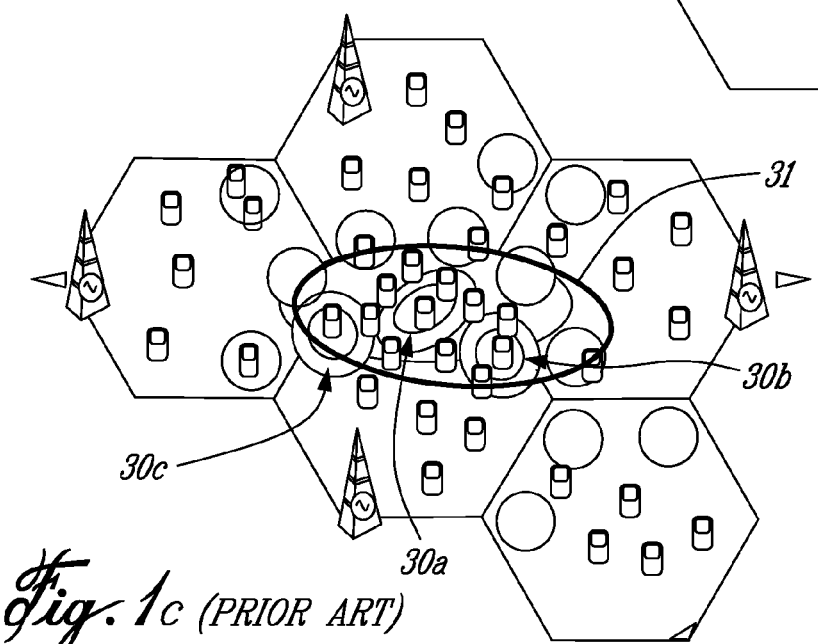

A further problem can occur when it may be decided to extend the range of the low power nodes in order to absorb as many users as possible in the area. This is illustrated at 30a, 30b and 30c in FIG. 1c, where the coverage of these micro cells is extended. The amount of available resources per small cell is shared within a higher number of users and consequently user data rates are not much higher than the ones within the macro layer. In effect, this can create a temporary high concentration of users within an area, 31. As explained previously, two primary effects will be observed in the downlink i) users connected to lower power nodes due to this range expansion could experience worse link conditions than on the link to the macro base station and ii) a higher number of users share the pool of resources within the small cell and as such, the peak individual user capacity may be limited by the total shared capacity of the LPN.

Figure 2A:
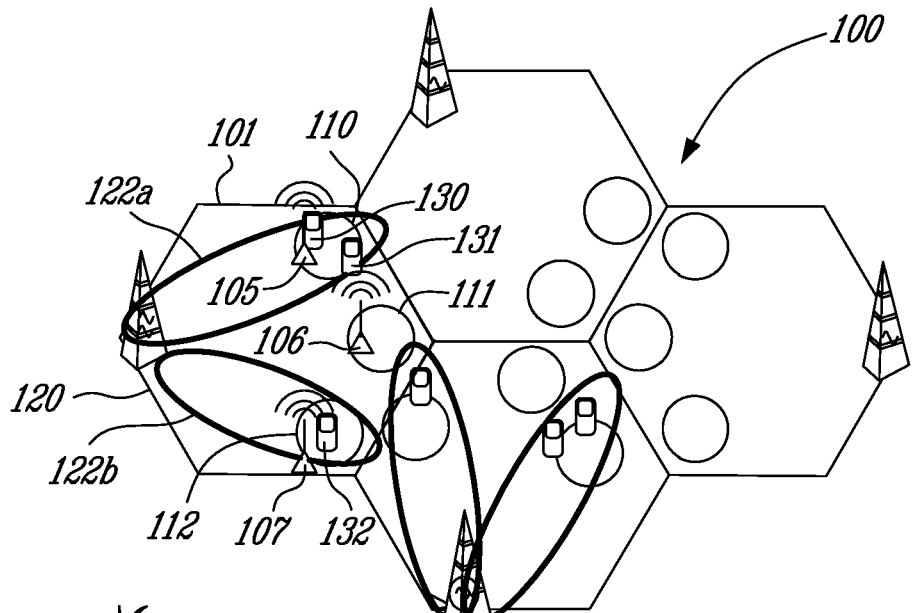
FIGS. 2a and 2b are schematic diagrams of a first and second embodiment of the present invention.

FIG. 2a will be used to describe a portion of a heterogeneous radio access network 100 according to a first embodiment of the present invention. In FIG. 2a, a heterogeneous radio access network 100 includes a macro cell 101 which is served by macro base station 120. One or more micro base stations or LPNs 105, 106 and 107, are situated within or proximate macro cell 100 and serve, corresponding micro cells 110, 111 and 112. Note that in general, each LPN correspond to a specific micro-cell, ie. Only one LPN will be associated with one micro-cell. The macro and micro base stations communicate over an air or radio interface with one or more wireless terminals, also known as user equipment units (UEs). One such representative wireless terminal (UE) 130 is shown and arbitrarily positioned in FIG. 2a.

Macro base station 120 provides beam forming signals 122a, 122b within an area consisting of open access (OA) low power nodes (LPNs). In this macro cell layer, the macro base stations beams are directed towards the OA LPNs 105 and 107 and a COMP scheme is applied to users 130, 131 and 132 that lie in the common coverage area of the LPNs 105, 107 and macro base station beams 122a and 122b. It should be noted that there could be 2 CoMP schemes active in this example. User 132 in the coverage area of LPN 107 may not be in a common coverage area with users 130 and 131 in the LPN 105 coverage area, and as such users 130 and 131 may be in a CoMP region of LPN 105 with macro cell 120 and user 132 may have a separate CoMP session by LPN 107 and macro cell 120. It should also be noted that an LPN (or the cells served by LPNs) can have one of the following access modes:

1. Open Access (OA)—access to all users in an operators network;

2. Closed Subscriber Group (CSG)—access only to authorized users, i.e. the users belonging in the CSG, typically, the owners of the picos/femtos (or Home eNBs) & their family, visitors, or clients; or 3. Hybrid Access—originally CSG small cells which temporarily become OA.

Macro base station 120 is made aware of the location of LPNs 105, 106 and 107 being placed within its coverage area 100. This information can be known either via OAM, or LPNs can measure the signal received by the closest macro base stations, along with the angle of arrival of the signal received. An example of one such signal from the macro base station for LTE implementations is the downlink (DL) common reference signal (CRS) which can easily be measured and decoded by the LPNs. Hence LPNs can transfer this information to macro base stations in their area. Macro base stations being aware of the location of LPNs, steer their beams towards LPNs. The LPNs, might extend their coverage area so as to absorb as many users as possible from the macro cells. This results in a significant number of users being in the coverage area of LPNs and macro layer beams. Those users can benefit from COMP schemes either in their downlink control channel region, or in the data region. For the data region, COMP schemes can be applied within both the downlink and uplink.

When the macro base station and micro base station are part of a Coordinated Multipoint (CoMP) system, the signaling or control information (e.g., the control channel) may be common for both the macro layer and the micro layer.

In another embodiment, the LPNs can be instructed to extend their range and apply a COMP scheme when a requirement exists to provide cell edge data rates above a first certain threshold set by the operator, say DataRateThreshold_1. It should be noted that a given operator might want to offer a given data rate at cell edges within a given geographical area. These thresholds can be based on the ones imposed by the performance requirements of an existing wireless standard, such as for the LTE Advanced standard.

Figure 2B:
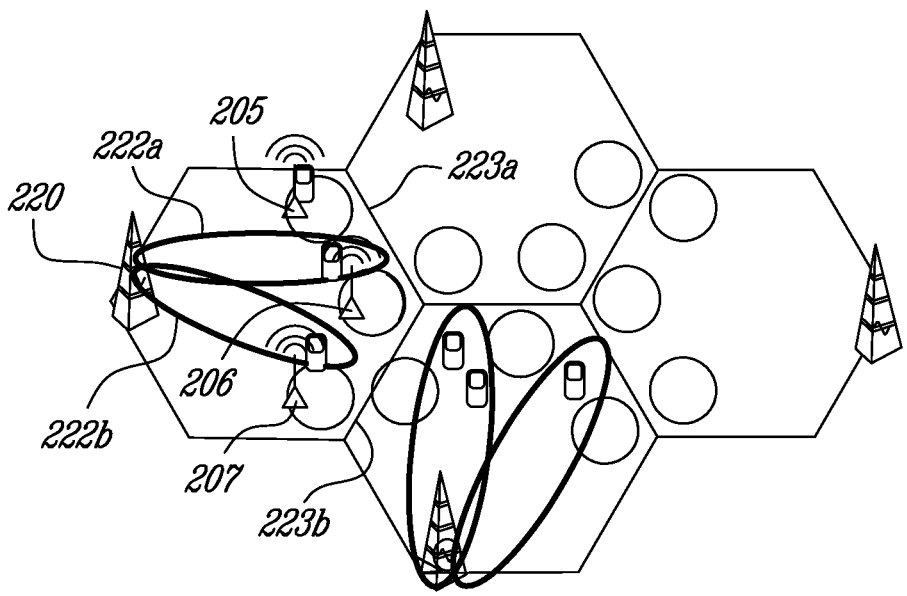

In another embodiment of the present invention, illustrated in FIG. 2b, macro base station 220 is directed to steer its signal beams 222a and 222b towards edges 223a and 223b respectively. These are the macro cell edges which do not have LPNs in their areas. Macro base station 220 is aware of the location of LPNs 205, 206 and 207 within its coverage area and hence the macro base station can steer their beams accordingly. As indicated above, this information can be known either via OAM, or LPNs can measure the signal received by the closest macro base stations, along with the angle of arrival of the signal received.

The embodiment, illustrated in FIG. 2b, is well suited to areas where deployment of LPNs covering all the macro layer cell edge area is not possible. This scenario may be used alternatively with the embodiment of FIG. 2a, that is, the first embodiment is used in the case where almost all of the cell edge area is deployed with LPNs, complemented by the second embodiment in areas where the whole cell edge area is not covered by LPNs. In this case range extensions of small cells are not applied, and the macro base station is aware of the existence of users at the macro cell edge without being connected to LPNs. Furthermore macro base stations then steer their beams to cell edge areas not covered by LPNs to reach UEs in that region of the cell.

In a further variation, macro base stations can be directed to steer beams towards cell edge areas, for cases in which LPNs do not provide coverage and do not extend their cell range but when a requirement exist to provide cell edge data rates above a second certain threshold set by the operator, say DataRateThreshold_2, and wherein DataRateThreshold_2 is typically less than DataRateThreshold_1.

Figure 3A:
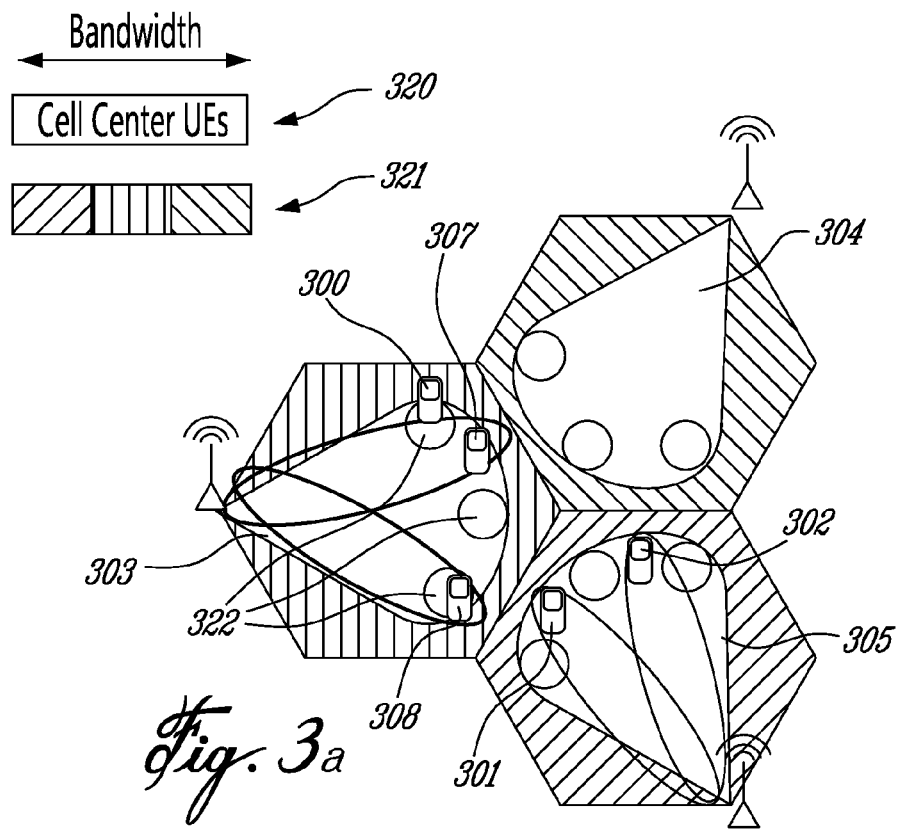
FIGS. 3a and 3b are schematic diagrams of a third and fourth embodiment of the present invention.

In an another embodiment of the invention shown in FIG. 3a, LPNs are used together with macro layer beamforming for the provision of cell edge high data rate throughput within a macro layer system where macro and pico cells apply Fractional Frequency Reuse (FFR) schemes for reduction of other cell interference.

In some applications, this issue is addressed by tweaking the frequency reuse. It works by allowing certain users 300, 301 and 302 at a cell center to operate on all available sub-channels. Cell center is shown in FIG. 3a by the area 303, 304 and 305 closer to a base station that is particularly immune to co-channel interference and hence can use the full bandwidth, see box 320. On the other hand, users 307 and 308 at a cell edge are only allowed to operate on a fraction of all available sub-channels in view of their proximity to adjacent cells. The sub-channel fractions (see box 321) are allocated in such a way that adjacent cells' edges will operate on different sets of sub-channels.

In FIG. 3a, cell center 303 uses all available sub-channels, whereas the cell edges outside cell center 303 operate on one fraction of these channels. Cell edges outside the cell centers 304 and 305 are assigned different fractions of the available sub channels so long as each adjacent cell edge of a macro cell operates on a different set of sub-channels. This is called fractional frequency reuse (FFR).

Fractional frequency reuse takes advantage of the fact that the UE transmits on sub-channels (because in OFDMA a channel is divided into sub-channels) and doesn't occupy an entire channel such as in 3G (CDMA2000 or WCDMA). Fractional frequency reuse maximizes spectral efficiency for users at a cell center and improves signal strength and throughput for users at a cell edge.

In FIG. 3a, orthogonal bands 321 are used between neighboring macro cells but pico cells operate on the same band. This arrangement is ideal for situations where inter-pico cell interference is not an issue, that is, where there is a lower density of pico cells and a larger distance between pico cells.

Figure 3B:
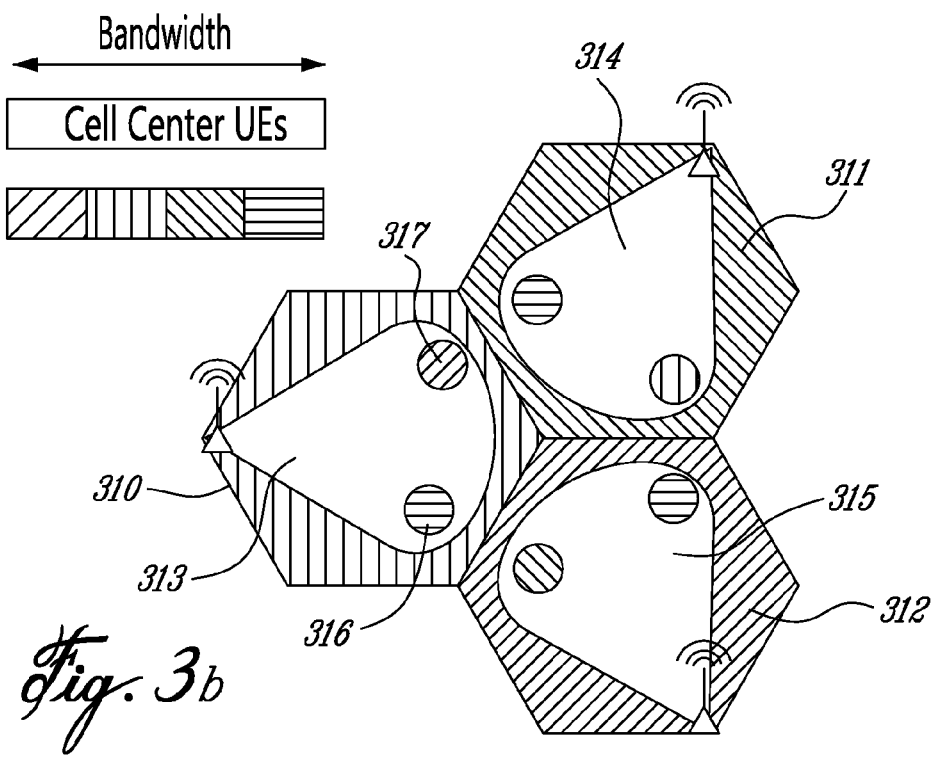

In FIG. 3b, a similar arrangement exists with regards to macro cells, that is, orthogonal bands are used between macro cell 310, 311 and 312. Similarly, cell centers 313, 314 and 315 operate on all available sub-channels. However, in this embodiment, each adjacent pico cell operates in orthogonal bands between neighbors. For example, in cell 310, pico cell 316 is set to operate at a different band to that of pico cell 317. This arrangement avoids interference between macro cells, between macro and pico cells and between adjacent pico cells.

Figure 4:
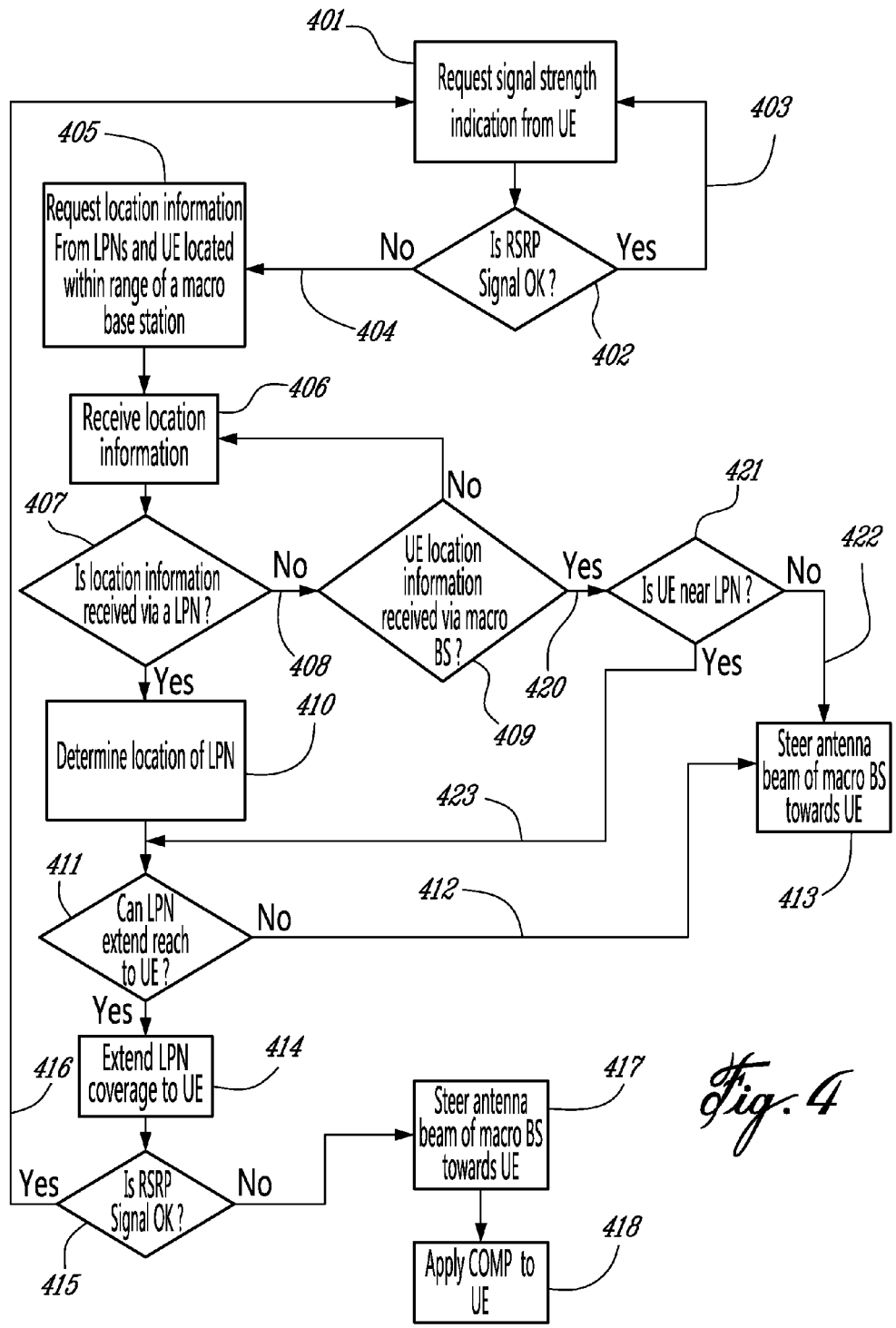
FIGS. 4 and 5 are slow charts showing non-limiting acts or steps used in the present invention.
Figure 5:
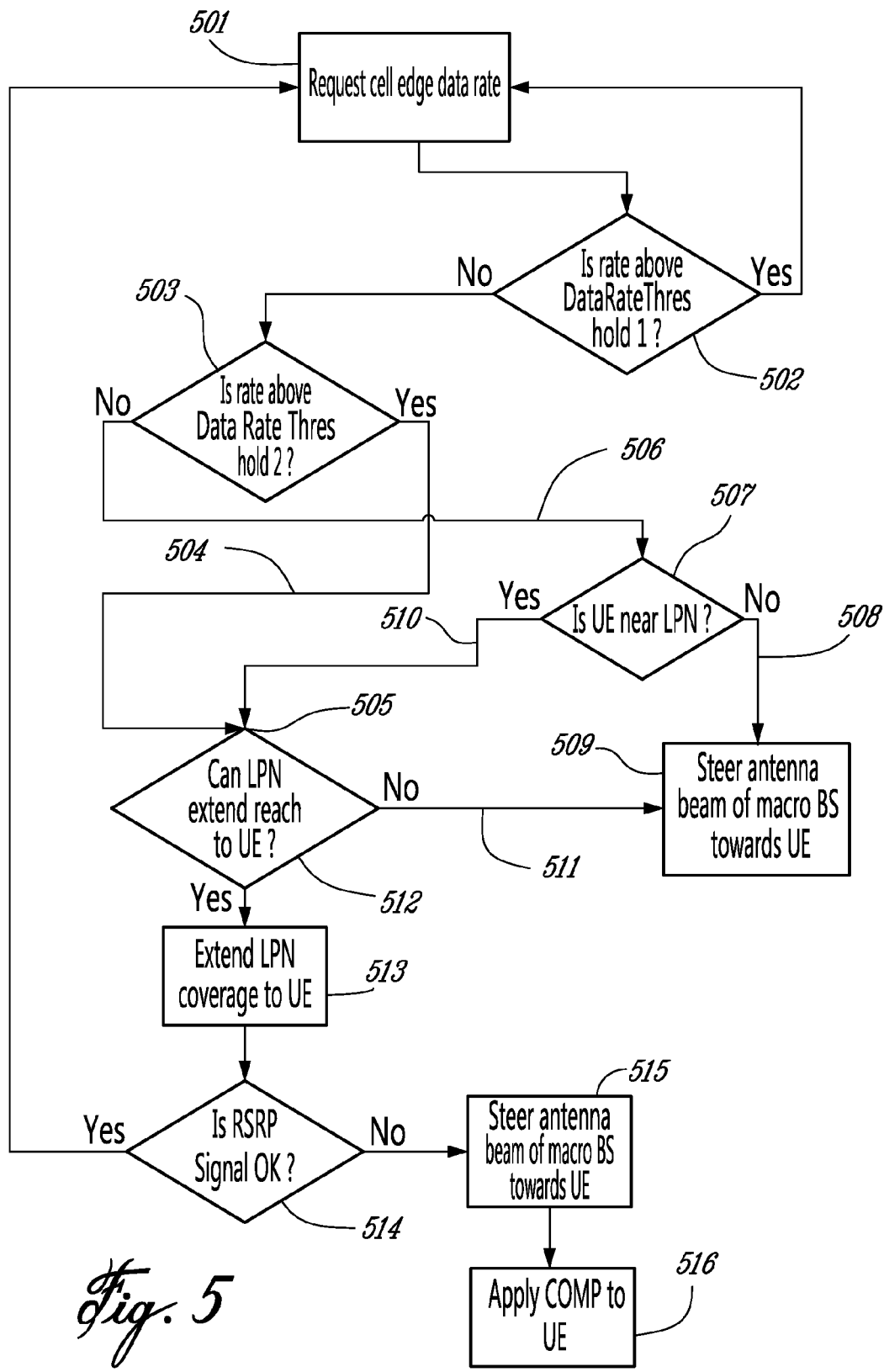

Referring now to FIGS. 4 and 5, are flowcharts showing representative, non-limiting acts or steps included in a basic method of improving data rate to a base station node according to an example embodiment and mode.

In FIG. 4, at block 401, the macro base station requests a signal strength indication from a UE. At decision block 402, if the response from the UE indicates that the signal is adequate or OK, then the flow 403 is directed back to block 401. If the signal is not Ok or is inadequate 404, the macro base station, at block 405, requests location information from LPNs and UE's located within range of the macro base station. It should be noted that the information associated with the location of the LPN is either received at block 406 or already known to the macro base station when first commissioned. Decision block 407 determines if the location information associated with the UE is received from an LPN. If no 408, then it is checked to see if the UE location information was received by the macro base station. If yes, then the signal information was received via a LPN. We can determine the location of a UE at block 410 from the location signal received and angle of arrival of the received signal. The location signal is commonly referred to as Positioning Reference Signal (PRS) in LTE. The particular use of the PRS to locate a UE will be known to those knowledgeable in the art and dependent on the particular Standard Release.

At decision block 411, the LPN is queried to see if it can extend the reach to the UE. If no, then path 412 directs to block 413, whereby the macro base station is requested to steer its antenna beam towards the UE. If the LPN can extend its reach to the UE, then at block 414, the LPN is tasked to do so. A signal check is then completed at decision block 415. If the signal is OK, the path 416 is directed back to block 401. If the signal is not OK, meaning that the LPN can reach the UE but may not be able to adequately support it, then at block 417, the macro base station is directed to steer its antenna beam towards the LPN to capture the UE to capture it. At block 418, a COMP scheme is applied.

Back at path 408, a UE location signal or PRS is received. If, at decision block 409, the UE location signal is not received via the macro base station, the received location signal is further analyzed at block 406. If it was received via the macro base station at path 420, then a query is requested at decision block 421 to determine if the UE is near an LPN. If the response is no, at path 422, then the macro base station is requested to steer its antenna beam towards the UE at block 413. If the response is yes, at path 423, then the LPN is requested to determine if it can reach the UE at block 411.

The flow diagram of FIG. 5 applies to situations in which macro base stations can be directed to steer beams towards cell edge areas, for cases in which LPNs do not provide coverage and do not extend their cell range, and when a requirement exists to provide cell edge data rates above a second certain threshold set by the operator, say DataRateThreshold_2, and wherein DataRateThreshold_2 is less than DataRateThreshold_1.

At block 501, a request is made by the macro base station for the cell edge data rate. At block 502, a decision is made based on the level of the data rate. If the rate is above a predetermined level, say DataRateThreshold_1, no change is required and the path returns to block 501. If the level of the requested data rate is below the DataRateThreshold_1 then another data rate level query, at block 503, is made. Is the rate above DataRateThreshold_2. If the response is yes at path 504, then the data rate level is between DataRateThreshold_1 and DataRateThreshold_2 since DataRateThreshold_2 is less than DataRateThreshold_1. Path 504 then triggers a request at decision block 505 to determine if the LPN can extend its reach to the UE. If the response to decision block 503 is no, then path 506 triggers a request at decision block 507 to determine if the UE is near an LPN. If the UE is not near an LPN (path 508), then the macro base station is instructed to steer its antenna beam towards the UE (block 509). If the UE is near an LPN (path 510), a request is triggered back at block 505 to determine if an LPN can extend its reach to the UE. If no (path 511), then the macro base station should steer its antenna beam towards the UE. If yes (path 512), then the LPN is instructed to extend its coverage to the UE (block 513). At decision block 514, a signal check is made. If the RSRP signal is adequate, the flow returns to block 501. The signal is not adequate, meaning that the LPN coverage of the UE does not meet the operators RSRP requirements, then at block 515 the macro base station is instructed to steer its beam towards the UE and at block 516, and apply a COMP scheme to the UE.

FIG. 4 can be seen as a more general representation of FIG. 5; i.e. the signal strength indication used in the evaluation at step 401 of FIG. 4 can be the signal strength required so as to offer the data rate DataRateThreshold 1 or DataRateThreshold 2.

Figure 6:
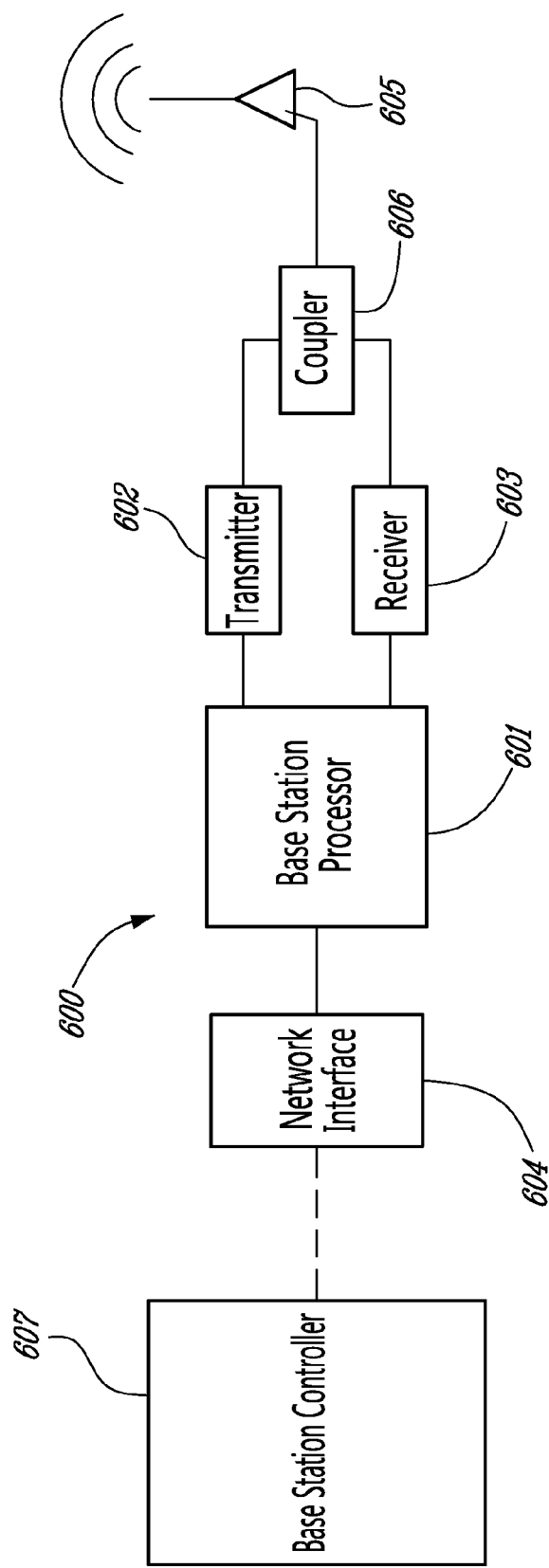
FIG. 6 illustrates a block diagram of an embodiment base station.

A block diagram of an embodiment base station 600 is shown in FIG. 6. The base station 600 is typically comprised of a base station processor 601 coupled to a transmitter 602 and receiver 603, and network interface 604. Transmitter 602 and receiver 603 are coupled to antenna 605 via coupler 606. The base station processor 601 will typically perform the above described methods and algorithms for a predetermined macro cell. A base station controller 607 will interact with one or more base stations 600 when there is a need to control the overall operation of the network. Base station processor 601 will identify the location of the UE and its signal strength based on the RSRP and estimate of the angle of arrival of the UE signal as received by receiver 603. The base station processor 601 would typically have the necessary functionality and procedures for processing between the MAC & physical layer of both transmission and reception signals. If a higher UE location estimation accuracy is required, the base station 600 may need to combine information on the specific UE from a neighbouring base station via the base station controller 607. Similarly, the base station controller 607 in conjunction with the base station 600 is used to provide the necessary beam forming technique described herein.

We claim:

1. A method of operating a base station for improving data rates in a heterogeneous network which is composed of macro cells and pico cells, and wherein user equipment connects to the network via one of said base station serving a macro cell or a low power node serving said pico cell, comprising the steps of:
    a) receiving a signal strength indicator from one or more UEs located in said heterogeneous network;
    b) identifying a weak coverage area for a user equipment located in said macro cell according to said signal strength indicator;
    c) identifying the location of said UE within a region of said heterogeneous network when said signal strength indicator is below a certain level; and
    d) directing a beam forming antenna of a base station serving said macro cell where said UE is located towards an area of said cell requiring an improved signal strength.

2. A method as defined in claim 1, wherein said signal strength indicator is provided for a serving macro cell and a neighboring pico cell by said UE via its serving macro cell and neighboring pico cell.

3. A method as defined in claim 2, wherein said beam forming antenna is steered towards low power nodes in order to extend network coverage towards said low power node.

4. A method as defined in claim 2, wherein said beam forming antenna is steered towards a macro cell edge where there is limited or no signal strength from a pico cell.

5. A method as defined in claim 2, wherein said beam forming antenna is steered towards low power nodes and towards a macro cell edge where there is limited or no signal strength from a pico cell.

6. A method as defined in claim 5, wherein said macro and pico cells apply a fractional frequency reuse scheme to reduce adjacent cell interference.

7. A method as defined in claim 3, wherein said beam forming antenna is steered towards low power nodes and a coordinated multi-point scheme is applied between said macro cell and pico cell serving said UE when a cell edge data rate above a first specified threshold is required.

8. A method as defined in claim 4, wherein said beam forming antenna is steered towards a macro cell edge and a coordinated multi-point scheme is applied when a cell edge data rate above a second specified threshold is required.

9. A method as defined in claim 8, wherein said first specified threshold is higher than said second specified threshold.

10. A method as defined in claim 8 wherein said beam forming scheme is implemented in a Multi-user MIMO network.

11. A method as defined in claim 6, wherein neighboring macro cells operate on bands orthogonal to each other and pico cells operating within a macro cell operate on similar bands.

12. A method as defined in claim 6, wherein both neighboring macro and pico cells operate on bands orthogonal to each other.

13. A method as defined in claim 6, wherein neighboring macro cells operate on similar bands and pico cells operate on bands orthogonal to each other.

14. A base station for improving data rates in a heterogeneous network which is composed of macro cells and pico cells, and wherein user equipment connects to the network via said base station, comprising:
   an antenna;
   a transmitter coupled to the antenna;
   a receiver for receiving a signal strength indicator from one or more user equipment located in said heterogeneous network;
   a processor for identifying a weak coverage area for a user equipment located in said macro cell according to said signal strength indicator and for identifying the location of said user equipment within a region of said heterogeneous network when said signal strength indicator is below a certain level; and wherein said antenna is instructed to direct its beam towards said user equipment and an area of said cell requiring an improved signal strength.

15. A base station as defined in claim 14, wherein said signal strength indicator is provided for a serving macro cell and a neighboring pico cell by said UE via its serving macro cell and neighboring pico cell.

16. A base station as defined in claim 15, wherein said antenna steers its beam towards low power nodes in order to extend network coverage towards said low power node.

17. A base station as defined in claim 15, wherein said antenna steers its beam towards a macro cell edge where there is limited or no signal strength available from a pico cell.

18. A base station as defined in claim 15, wherein said antenna steers its beam towards a low power node and towards a macro cell edge where there is limited or no signal strength from a pico cell.

19. A base station as defined in claim 18, wherein said macro and pico cells apply a fractional frequency reuse scheme to reduce adjacent cell interference.

20. A base station as defined in claim 16, wherein said antenna steers its beam towards low power nodes and a coordinated multi-point scheme is applied between said macro cell and pico cell serving said UE when a cell edge data rate above a first specified threshold is required.

21. A base station as defined in claim 17, wherein said antenna steers its beam towards a macro cell edge and a coordinated multi-point scheme is applied when a cell edge data rate above a second specified is required.

22. A base station as defined in claim 21, wherein said first specified threshold is higher than said second specified threshold.

23. A base station as defined in claim 21 wherein said beam forming scheme is implemented in a Multi-user MIMO network.

24. A base station as defined in claim 19, wherein both neighboring macro and pico cells operate on bands orthogonal to each other.

25. A base station as defined in claim 19, wherein neighboring macro cells operate on similar bands and pico cells operate on bands orthogonal to each other.

* * * * *